(12) United States Patent
Kaplan et al.

(10) Patent No.: US 12,054,341 B2
(45) Date of Patent: Aug. 6, 2024

(54) CENTER TRACKING DUAL SYNCHRONOUS BELT SYSTEM

(71) Applicant: ContiTech Antriebssysteme GmbH, Hannover (DE)

(72) Inventors: Jacob Kaplan, Omaha, NE (US); Christopher Ganshert, Lincoln, NE (US); Ben Roberts, Lincoln, NE (US)

(73) Assignee: ContiTech Antriebssysteme GmbH, Hannover (DE)

( * ) Notice: Subject to any disclaimer, the term of this patent is extended or adjusted under 35 U.S.C. 154(b) by 607 days.

(21) Appl. No.: 17/303,902

(22) Filed: Jun. 10, 2021

(65) Prior Publication Data

US 2022/0396428 A1 Dec. 15, 2022

(51) Int. Cl.
*A01D 57/20* (2006.01)
*A01D 45/02* (2006.01)
(Continued)

(52) U.S. Cl.
CPC ........... B65G 15/44 (2013.01); *A01D 45/023* (2013.01); B65G 15/52 (2013.01); B65G 17/44 (2013.01);
(Continued)

(58) Field of Classification Search
CPC ........ B65G 23/06; B65G 15/10; B65G 15/26; B65G 15/28; B65G 15/36; B65G 15/42;
(Continued)

(56) References Cited

U.S. PATENT DOCUMENTS

| 1,056,727 A | 3/1913 | Asper |
| 3,338,107 A | 8/1967 | Carl et al. |

(Continued)

FOREIGN PATENT DOCUMENTS

| CN | 102001412 A | 4/2011 |
| CN | 110182542 A | 8/2019 |

(Continued)

OTHER PUBLICATIONS

International Search Report and Written Opinion dated Sep. 23, 2022 of International Application PCT/EP2022/064379 claiming priority this application.

(Continued)

*Primary Examiner* — Stephanie M Ziegle
*Assistant Examiner* — Robert E Pezzuto
(74) *Attorney, Agent, or Firm* — Gregory Adams; Richard A. Wolf

(57) ABSTRACT

Synchronous belt systems include two or more sprockets, a first endless belt, and a second endless belt. The belts are connected together with belts attachment hardware through belt ports, and a belts gap is defined between the first endless belt and the second endless belt. Each of the sprockets includes sprocket teeth and sprocket tooth spaces between adjacent teeth of the sprocket teeth, and each of the sprockets has a sprocket center ridge. The belts each include a plurality of belt split teeth, and each split tooth of the plurality of belt split teeth has a first belt ridge, a second belt ridge and a belt split tooth space disposed between the belt ridges. The belts gap engages the sprocket center ridge of each of the sprockets, and each of the belts attachment hardware is disposed within the adjacent belt split tooth spaces of the belts.

20 Claims, 10 Drawing Sheets

(51) Int. Cl.
*A01D 61/00* (2006.01)
*B65G 15/36* (2006.01)
*B65G 15/44* (2006.01)
*B65G 15/52* (2006.01)
*B65G 17/44* (2006.01)
*B65G 23/06* (2006.01)

(52) U.S. Cl.
CPC ........ *B65G 23/06* (2013.01); *B65G 2201/042* (2013.01)

(58) Field of Classification Search
CPC ........ B65G 15/44; B65G 15/52; B65G 15/58; B31B 70/00; B31B 70/04; A01D 45/021; A01D 45/023; A01D 61/02; A01D 61/04; A01D 61/008; F16G 1/28; F16H 7/023; F16H 55/00; F16H 55/06; F16H 55/36; F16H 55/48
See application file for complete search history.

(56) References Cited

U.S. PATENT DOCUMENTS

| | | | |
|---|---|---|---|
| 3,853,016 A | 12/1974 | Lane, III et al. | |
| 3,853,359 A | 12/1974 | Pusch | |
| 4,072,062 A | 2/1978 | Morling et al. | |
| 4,283,184 A * | 8/1981 | Berg | F16G 1/28 74/411 |
| 4,600,549 A * | 7/1986 | Rajala | B29D 29/00 425/114 |
| 4,805,388 A | 2/1989 | Kell | |
| 4,899,868 A | 2/1990 | Johnson | |
| 5,921,070 A | 7/1999 | Chamberlain | |
| 7,281,365 B2 | 10/2007 | Zürn et al. | |
| 7,874,134 B1 | 1/2011 | Hoffman | |
| 8,136,827 B2 | 3/2012 | Lumpkin | |
| 8,480,109 B1 | 7/2013 | Adams | |
| 8,596,447 B2 | 12/2013 | Gentz | |
| 9,717,182 B2 | 8/2017 | Rittershofer et al. | |
| 10,647,516 B2 | 5/2020 | Peters et al. | |
| 2006/0264286 A1 * | 11/2006 | Hodjat | F16H 55/171 474/152 |
| 2011/0011048 A1 | 1/2011 | Hoffman | |
| 2011/0049831 A1 | 3/2011 | Lumpkin | |
| 2014/0106917 A1 | 4/2014 | Yuan et al. | |
| 2016/0037724 A1 | 2/2016 | Rittershofer et al. | |
| 2017/0172064 A1 | 6/2017 | VanNahmen et al. | |
| 2019/0141894 A1 | 5/2019 | Feuerborn et al. | |
| 2020/0196529 A1 | 6/2020 | Schwefe et al. | |
| 2022/0396428 A1 | 12/2022 | Kaplan et al. | |

FOREIGN PATENT DOCUMENTS

| | | |
|---|---|---|
| DE | 102013226436 A1 | 6/2015 |
| DE | 102018219554 A1 | 5/2019 |
| DE | 102018112047 A1 | 11/2019 |
| DE | 102019213022 A1 | 3/2021 |
| EP | 0098336 A1 | 1/1984 |
| EP | 2191711 A1 | 6/2010 |
| EP | 2890916 A1 | 7/2015 |
| EP | 3673724 A1 | 7/2020 |
| TW | 201328933 A | 7/2013 |
| WO | 2013016381 A2 | 1/2013 |
| WO | 2021003168 A1 | 1/2021 |

OTHER PUBLICATIONS

International Search Report and Written Opinion dated Oct. 19, 2022 of International Application PCT/EP2022/064709 which claim application that are incorporated herein by reference thereto.
Office Action dated May 8, 2024 of related U.S. Appl. No. 17/303,904.

* cited by examiner

CENTER TRACKING DUAL SYNCHRONOUS BELT SYSTEM

FIELD

The field to which the disclosure generally relates to is synchronous belt systems for conveying, reaping or otherwise moving materials such as crops, grains, silage, particulates, sunflower, stone, sawdust, and the like.

BACKGROUND

This section provides background information to facilitate a better understanding of the various aspects of the disclosure. It should be understood that the statements in this section of this document are to be read in this light, and not as admissions of prior art.

When conventional belt conveying systems are used in harsh conditions, it is difficult to rely on flanged pulleys to sufficiently track the belts because debris accumulates on the side flanges of the pulleys. This ultimately results in belt misalignment, belt removal from the system, or even belt failure.

In some instances, a center track configuration is employed where a center flange on a pulley keeps the belt aligned. This allows debris to be cleared from the sides of the pulley. However, this configuration uses a single grooved belt where the groove is located in the center of the belt on the side which engages the pulley. Also, the belt is absent of teeth which leads to inefficient engagement with the pulley. Furthermore, manufacturing such belts with a center groove requires significant cost, effort and time, since the center groove must be molded or milled into the single belt. Molded grooves required complex cure mold configurations and can often only cure one belt at a time. Milled center groove belts require an additional process and equipment.

Thus, there is a need for improved belt systems which address the above described problems, and such needs are met, at least in part, with embodiments according to this disclosure.

SUMMARY

This section provides a general summary of the disclosure, and is not a necessarily a comprehensive disclosure of its full scope or all of its features.

In a first aspect of the disclosure, synchronous belt systems include two or more sprockets, a first endless belt, and a second endless belt. The first endless belt and the second endless belt are connected together with belts attachment hardware through belt ports, and a belts gap is defined between the first endless belt and the second endless belt. Each of the sprockets includes sprocket teeth and sprocket tooth spaces between adjacent teeth of the sprocket teeth, and each of the sprockets has a sprocket center ridge. The first endless belt and the second endless belt include a plurality of belt split teeth, and each split tooth of the plurality of belt split teeth has a first belt ridge, a second belt ridge and a belt split tooth space disposed between the first belt ridge and the second belt ridge. The belts gap engages the sprocket center ridge of each of the sprockets, and each of the belts attachment hardware is disposed within the adjacent belt split tooth spaces of the first endless belt and the second endless belt. In some cases, the synchronous belt system consists of two sprockets. Also, each of the belt ports may be disposed in each of the belt split teeth.

According to some other aspects, the belts attachment hardware has a connecting bar in contact with the first endless belt and the second endless belt. The belts attachment hardware may include a first threaded end, a first nut, a second threaded end and a second nut. Further, the first threaded end and the second threaded end may be opposing ends of a U-clamp.

In yet some other aspects of the disclosure, the synchronous belt systems further include a plurality of conveying lugs, or other material manipulating features or devices, and each are connected together with the belts attachment hardware through the belt ports. The conveying lugs, or other material manipulating features or devices, are disposed opposite the belt split teeth of the first endless belt and opposite the belt split teeth of the second endless belt.

The synchronous belt systems may have the plurality of sprockets connected to material manipulating equipment, and one of the sprockets is mounted to a drive shaft and the other(s) is/are mounted to an idler shaft(s). In some cases, the material manipulating equipment is crop conveying equipment. Also, the crop conveying equipment may be, but is not limited to, a crop gathering head of a harvester, and in such cases the synchronous belt systems may be used to gather crop, cut the crop, convey the crop, or otherwise manipulate the crop.

In some other aspects, the plurality of sprockets are connect to material cutting equipment, and a plurality of material cutting features may be connected to the first endless belt and the second endless belt with the belts attachment hardware through the belt ports. Each of the plurality of material cutting features may be disposed opposite the belt split teeth of the first endless belt and opposite the belt split teeth of the second endless belt. In some cases the material cutting features are crop cutting features.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
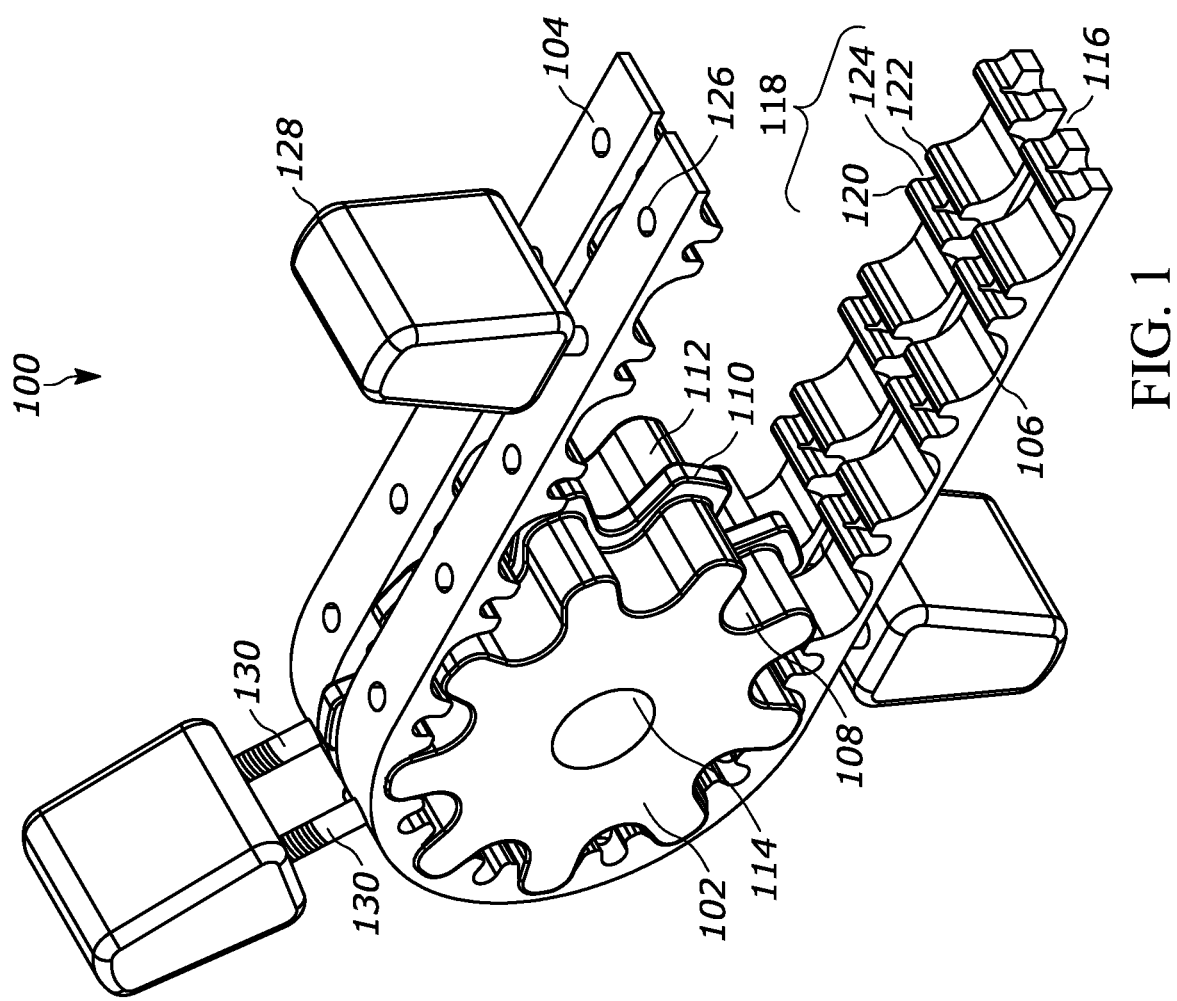
FIG. 1 a portion of a synchronous belt system embodiment in a perspective view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosures are synchronous belt systems for conveying, cutting or otherwise manipulating materials. The synchronous belt systems include a pair of endless belts which are positioned adjacent one another and mechanically, or otherwise physically attached. The synchronous belts engage two or more sprockets, which may have a smooth periphery or toothed periphery. Each sprocket includes a ridge which extends upward from the periphery and such ridge is positioned at any position inward from the outer axial edges of the sprocket. This sprocket configuration enables consistent alignment and center tracking of the synchronous belts as a gap between the synchronous belts engages with the ridge of each sprocket. The synchronous belts may include lugs, paddles, blades, or any other suitable feature(s) which interact with materials, and each is mechanically or physically attached to the synchronous belts.

The synchronous belts and lugs/features are matingly attached with one another with any suitable means, such as attachment hardware. Such attachment hardware may be metal or non-metal (i.e. urethane or rubber) which is bonded onto a side of each of the separate synchronous belts.

In those embodiments where the synchronous belts engage sprockets having a toothed periphery, the space defined between two adjacent teeth enable the synchronous belts to engage the sprocket without interference with the attachment hardware, and results in smooth/long lasting operation of the system. The synchronous belts may each have teeth, each of which may be of a split tooth configuration which defines a split tooth space. The split tooth space accommodates the attachment hardware so the belts engaging surfaces remain in mutual contact with the periphery of the toothed sprocket on both sides of the sprocket ridge.

Now referencing FIG. 1 which depicts a portion of one synchronous belt system according to the disclosure, in a perspective view. Synchronous belt system 100 generally includes sprocket 102, first belt 104 and second belt 106 which are positioned mutually adjacent one another. While one sprocket is shown in this partial view, system configurations with two, three, four, five, etc. sprockets are within the scope of the disclosure. The sprocket 102 defines tooth space 108 and includes a sprocket ridge 110 shown generally in the center, but which could be skewed either side of the center circumferential longitudinal line (also commonly referred to as an equatorial line) of the sprocket 102. Sprocket 102 also includes sprocket teeth 112 (nine shown) where two adjacent sprocket teeth 112 together define a tooth space 108 therebetween. While nine sprocket teeth 112 are shown, embodiments of the disclosure are not limited thereto, and any suitable number of sprocket teeth may be used. Sprocket 102 further includes a mounting port 114 which is used in conjunction with a fastener to secure sprocket 102 to a drive shaft, equipment frame, an idler shaft, or any other suitable material conveying/manipulating equipment or device.

Sprocket 102 may be formed of any suitable metal or non-metal. Some non-limiting example of non-metal materials include castable polymer materials, such as polyurethane polymers, polyester polymers, epoxy polymers, and the like. Non-limiting examples of materials, as well as designs for, forming the sprocket may also be found in U.S. Pat. No. 10,865,868 B2, of which the entire contents are incorporated herein by reference thereto. Some further non-limiting examples of materials, as well as designs for, forming the sprocket may also be found in U.S. patent application Ser. No. 17/062,570, titled "Composite Sprocket", filed Oct. 3, 2020, and the entire contents of this application are incorporated herein by reference thereto.

Synchronous belt system 100 further includes a belts gap 116 formed between first belt 104 and second belt 106. The belts gap 116 enables consistent alignment of first belt 104 and second belt 106 while in use with material. Each of first belt 104 and second belt 106 include a plurality of belt split teeth 118 (fourteen shown on each of the synchronous belts). Each of the belt split teeth 118 include a first belt ridge 120, a second belt ridge 122 and a belt split tooth space 124 defined between first belt ridge 120 and second belt ridge 122. As depicted in FIG. 1, first belt 104 and second belt 106 both are adjacent one another and run along same sprocket 102 in a side-by-side parallel manner. The gap 116 formed between first belt 104 and second belt 106 enables sprocket ridge 110 of sprocket 102 to help maintain alignment of first belt 104 and second belt 106.

Additionally, each of first belt 104 and second belt 106 include belt includes ports 126 (seven shown) which function accommodate a device(s) for matingly securing first belt 104, second belt 106 and, as an example, a corresponding conveying lug 128 (three shown) together. While conveying lugs 128 are shown, it is within the scope of the disclosure to employ any suitable other material manipulating features or devices in place of the lugs. Any suitable device(s) for matingly securing may be used, for example, belts attachment hardware 130. In the embodiment show, only one of four ports 126 are used to secure the belts and lugs 128; however, in some different embodiments, two of four may be used, two of three may be used, one of three may be used, or even one of five may be used, by example.

Generally, each of first belt 104 and second belt 106, or any belts according to the disclosure, include a belt carcass having parallel layers of polymeric flexible, resilient material. For example, polymeric materials which include the moldable natural or synthetic rubbers, or castable rubbers or urethanes may be used. Materials used to form the belt carcass may be like materials in some cases, while in some other cases, dissimilar materials. For example, in one aspect, the gathering belt carcass may be based upon a conventional rubber, while the attachable lug 128, or other material manipulating features or devices, may be based upon a resilient polyurethane material.

Any suitable rubbers or other materials may also be used for forming the belt carcasses or conveying lugs 128, features or devices, in accordance with the disclosure. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylenepropylene-diene copolymer rubbers such as ethylene-propylene-cyclopentadiene terpolymer, ethylene-propylene ethylidene norbornene terpolymer, and ethylene-propylene-I, 4-hexadiene terpolymer, butadiene-propylene copolymer rubber, butadiene-ethylene copolymer rubber, butadiene-isoprene copolymer, polypentenamer, styrene-butadiene-styrene block copolymers, epoxidized natural rubber and their mixtures. In general, such compounds are characterized by repeating olefinic unsaturation in the backbone of the polymer, which generally arises from the presence of butadiene or isoprene monomers in the polymer structure. Urethane materials formed by reacting isocyanate materials with polyester polyols, polyether polyols, polyacrylic polyols, and the like, may be used in compounds forming gathering belt carcasses and/or conveying lugs 128, or other material manipulating features or devices. In some alternative embodiments of the disclosure the lugs, or other material manipulating features or devices, made be formed from metal(s).

Figure 2:
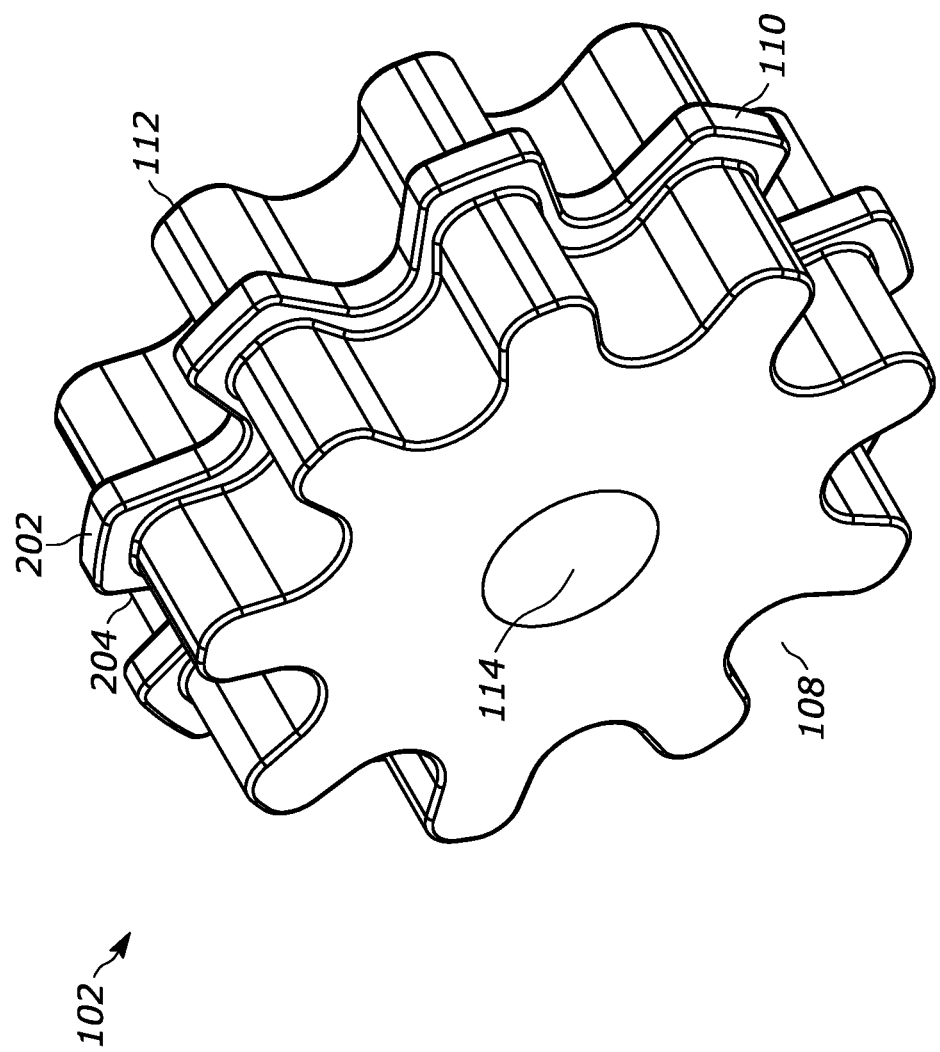
FIG. 2 shows a sprocket embodiment in a perspective view, in accordance with the disclosure.

With reference to FIG. 2, sprocket 102 is shown in more detail. Sprocket 102 in includes the sprocket center ridge 110, sprocket teeth 112, and sprocket mounting port 114 which may be used with any suitable connecter, such as a bolt, quick disconnect (QD) bushing, taper bushing and the like. Sprocket 102 also includes center ridge tooth 202 and sprocket center ridge tooth space 204. Center ridge tooth 202 enables alignment of the first belt 104 and the second belt 106 via belts gap 116. Sprocket center ridge tooth space 204 and tooth space 108, located on either side of center ridge tooth space 204, accommodate the belts attachment hardware 130 which results in smooth/long lasting operation of the system.

Figure 3:
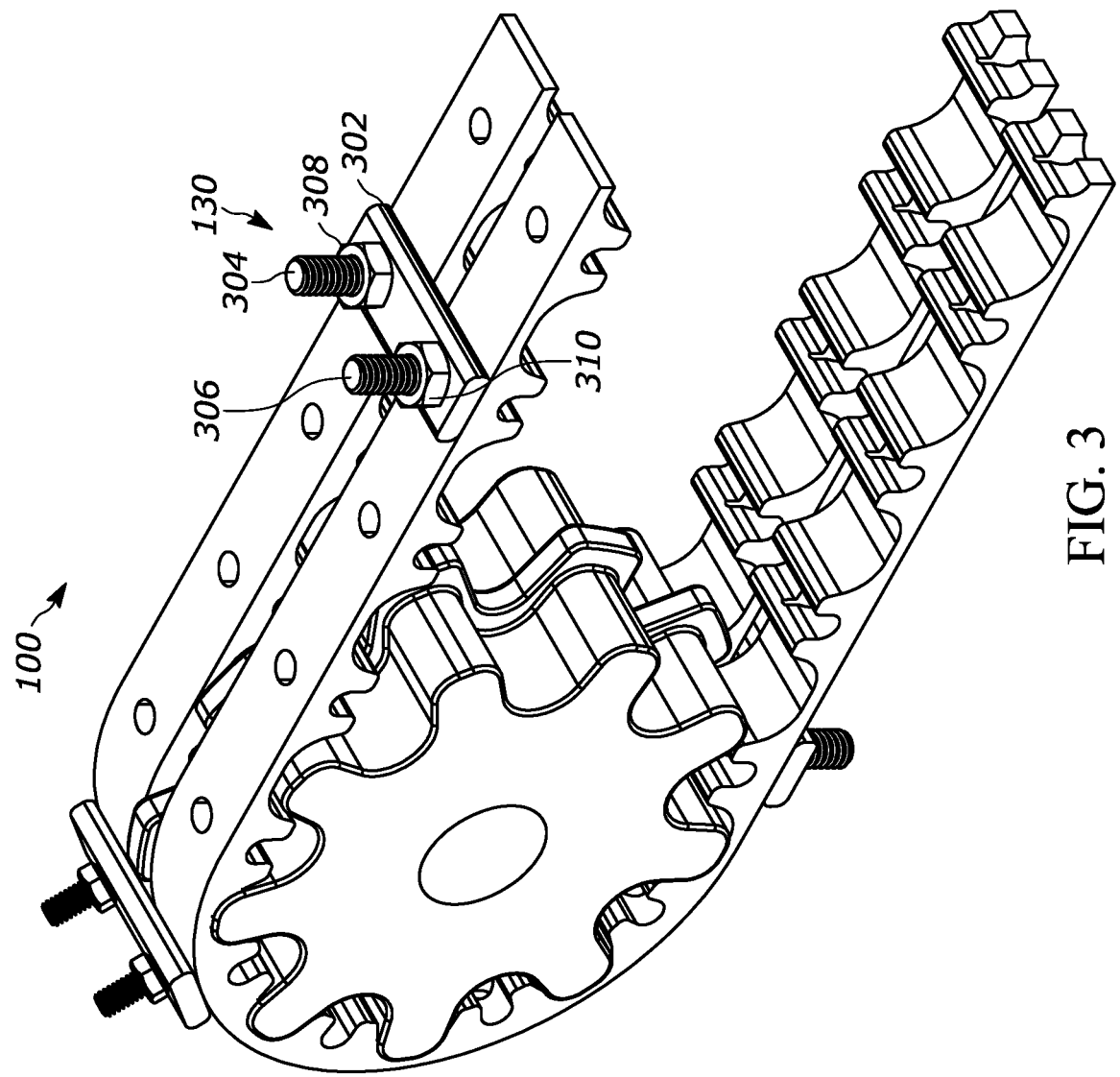
FIG. 3 illustrates a portion of a synchronous belt system embodiment with one type of belts attachment hardware in a perspective view, in accordance with the disclosure.
Figure 4:
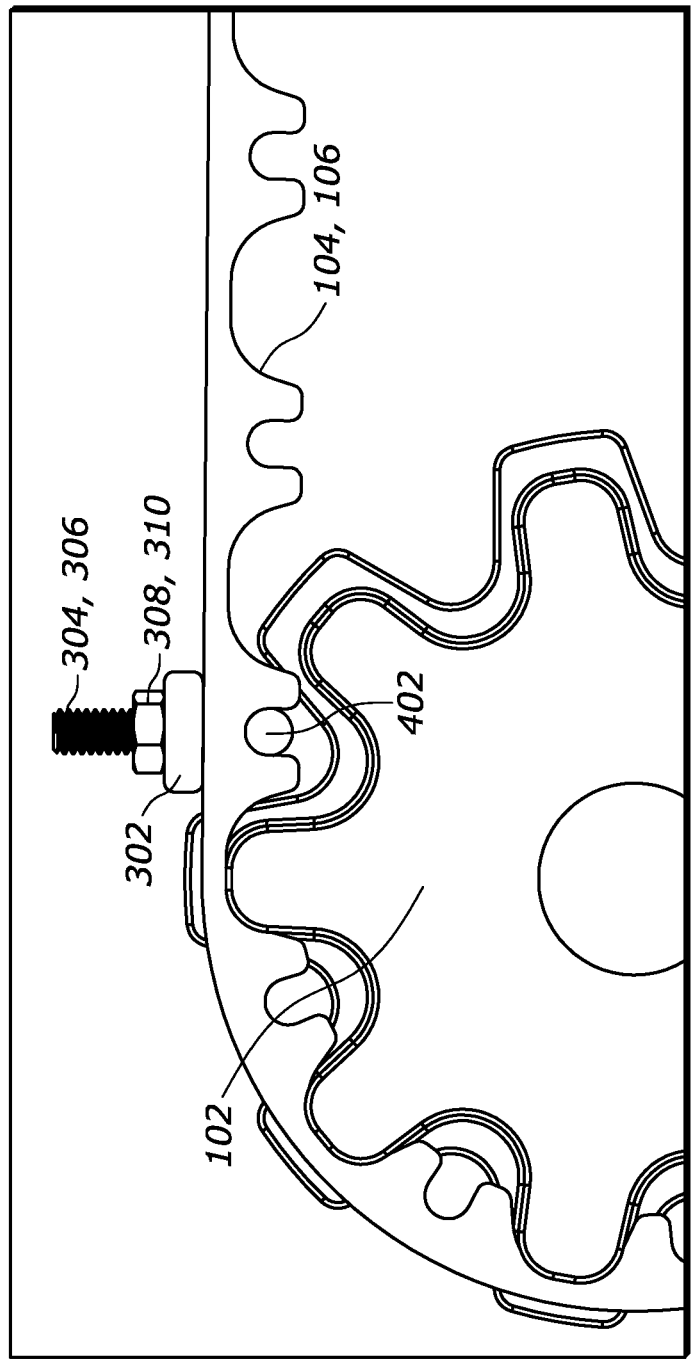
FIG. 4 depicts in a side view, a U-clamp used in belts attachment hardware, in accordance with the disclosure.

FIG. 3 illustrates a portion of a synchronous belt system embodiment with one type of belts attachment hardware where the hardware includes a connecting bar 302 and a first threaded end 304 and second threaded end 306. In some cases first threaded end 304 and second threaded end 306 may be from individual bolts passed through respective belt ports 126, while in some other cases, first threaded end 304 and second threaded end 306 are ends of a U-clamp, such as that depicted in FIG. 4 as threaded U-clamp 402. First nut 308 secures first threaded end 304 and second nut 310 secures second threaded end 306. A lug, or other suitable material manipulation device, can then be attached to the belts attachment hardware by any suitable configuration.

Figure 5:
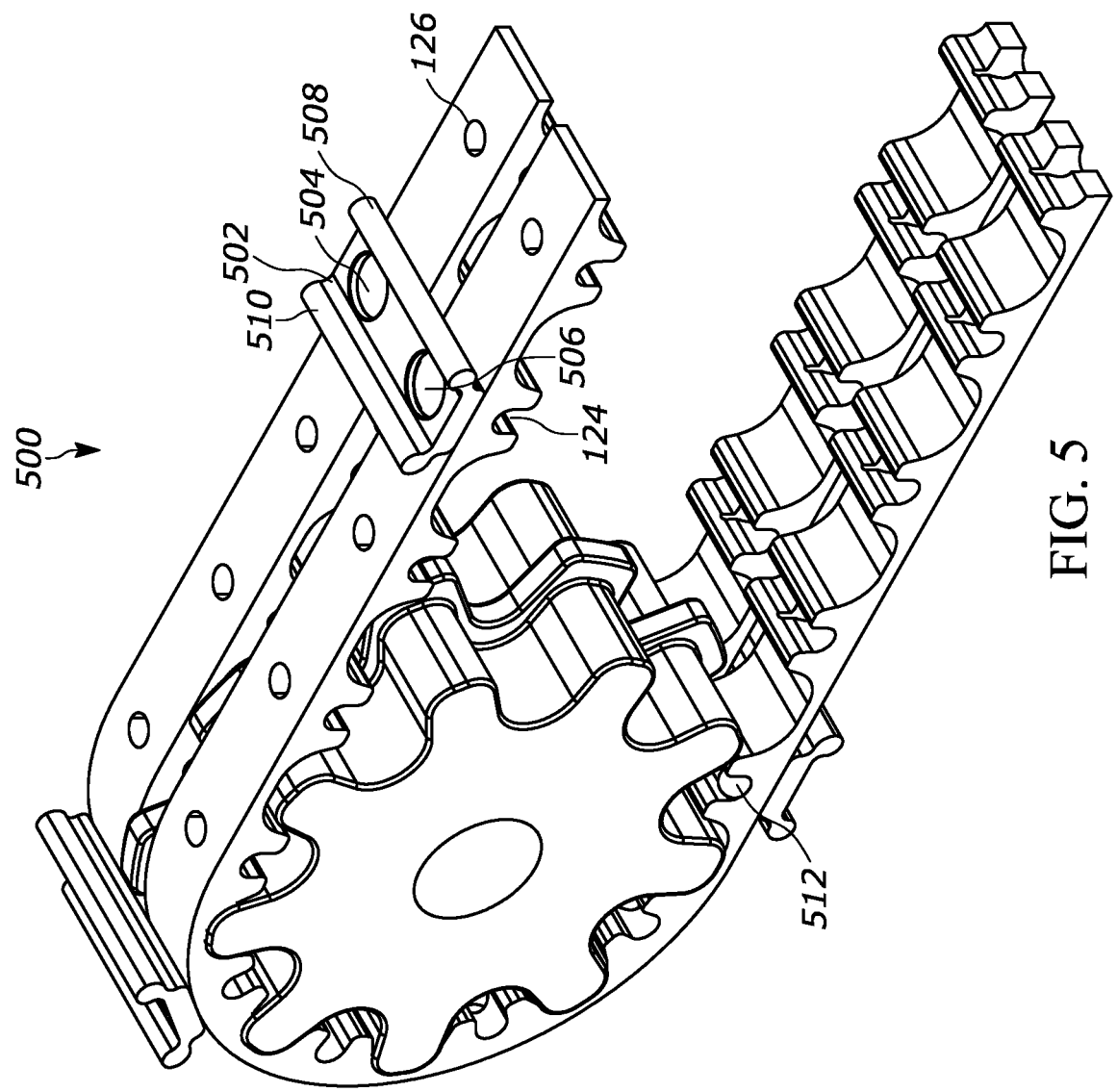
FIG. 5 illustrates a portion of another synchronous belt system embodiment with another type of belts attachment hardware in a perspective view, in accordance with the disclosure.
Figure 5A:
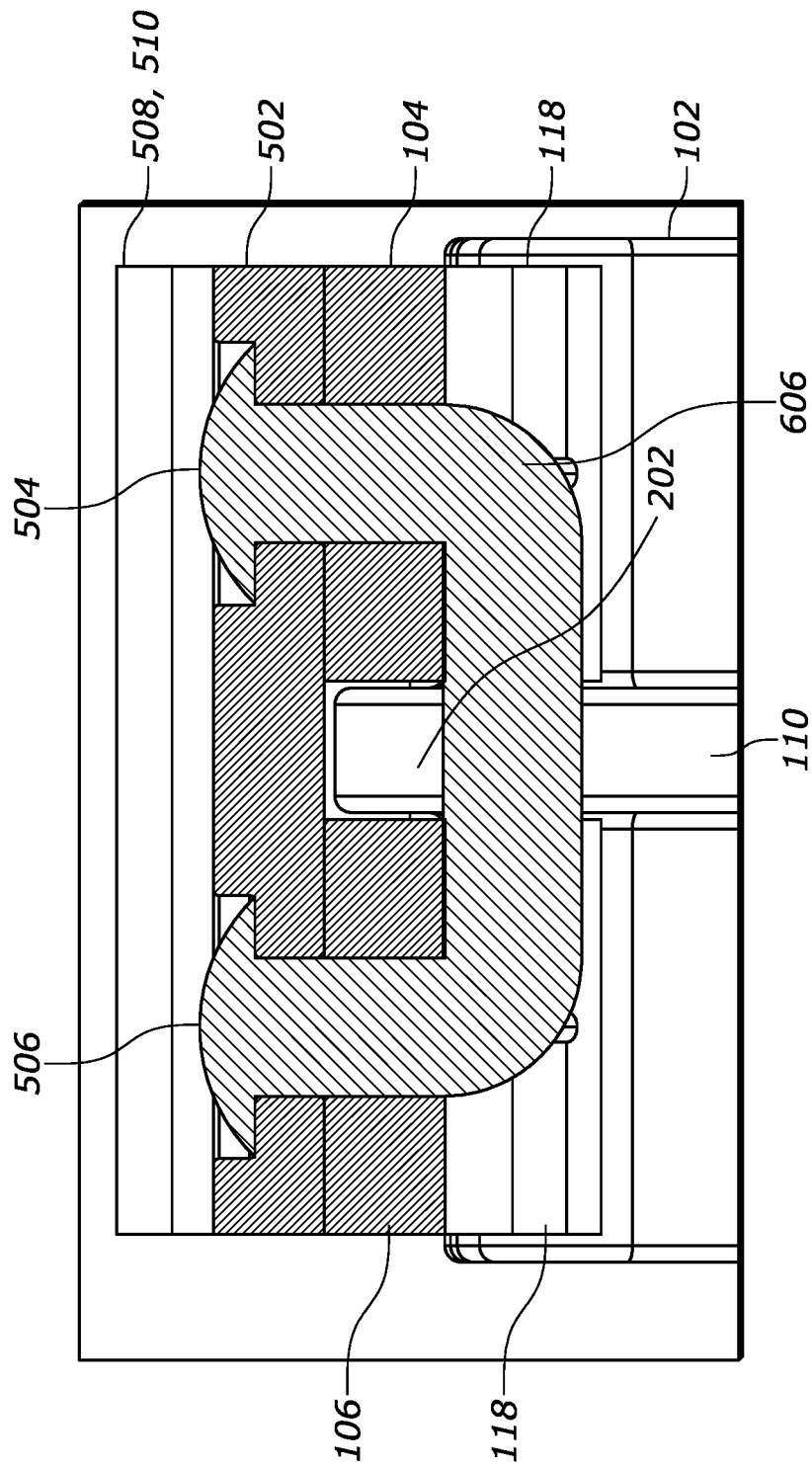
FIG. 5A illustrates another example of a securing device for use with the synchronous belt.

FIG. 5 illustrates a portion of another synchronous belt system embodiment 500 with another type of belts attachment hardware where the hardware includes a connecting bar 502 and a first push through connector 504 and second push through connector 506. The first push through connector 504 and the second push through connector 506 fittingly engage an opposing securing device 512, or devices, which is/are disposed in belt split tooth space 124, and one non-limiting example of such a securing device 512 is shown in FIG. 5A. The first push through connector 504 and the second push through connector 506 pass through respective belt ports 126. Connecting bar 502 includes a first retention flange 508 and opposing second retention flange 510, both of which extend across the complete width of connecting bar 502 and in an essentially perpendicular direction to the longitudinal direction of the belts, as shown and depicted.

Figure 6:
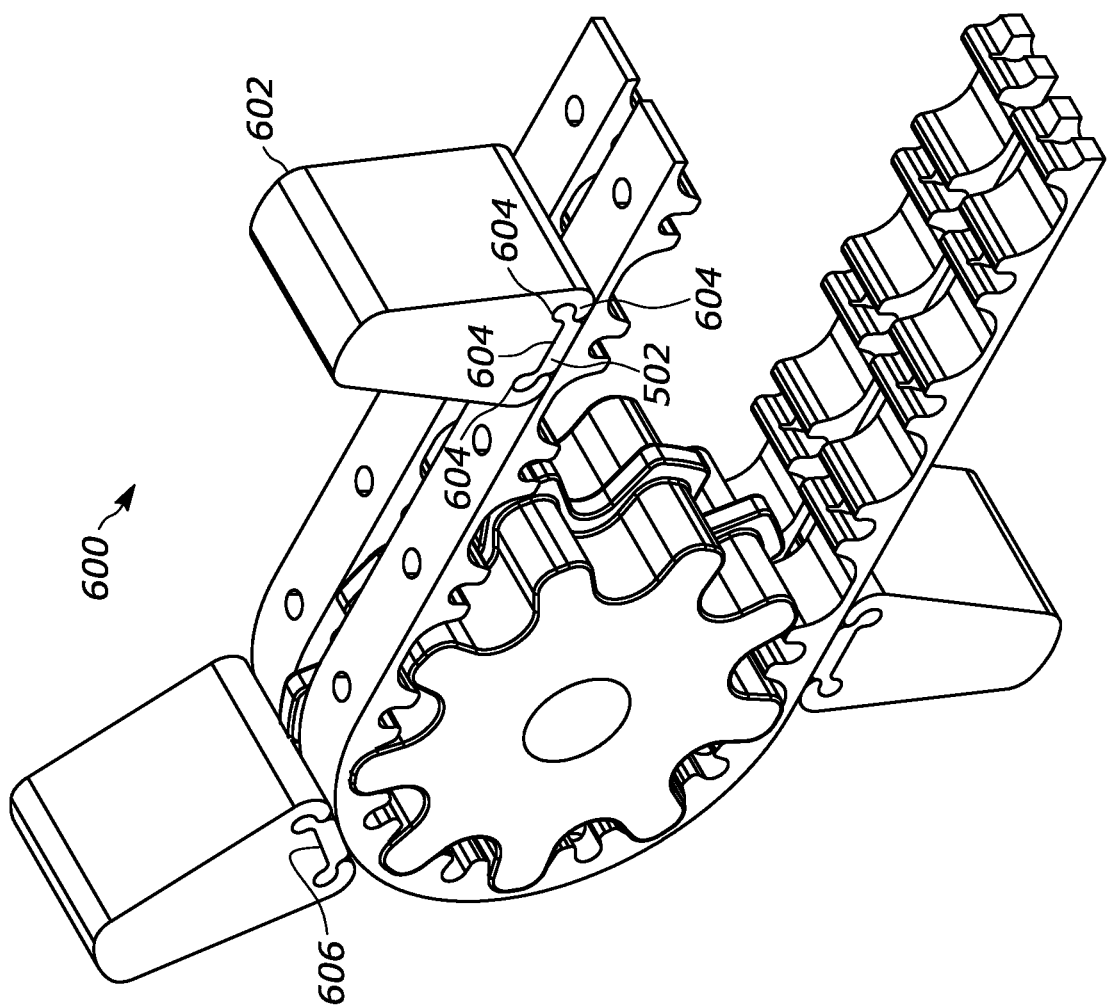
FIG. 6 depicts in a perspective view, a lug connected with belts attachment hardware shown in FIG. 5, in accordance with the disclosure.

The first retention flange 508 and opposing second retention flange 510 may be used for securing a conveying lug 128, or other material manipulating features or devices. As shown in FIG. 6, synchronous belt system 600 includes at least one conveying lug 602 (three shown) which, in turn, includes an attachment profile 604. The attachment profile 604 matingly secures with the outer surface 606 of connecting bar 502, thus providing a secure connection of the lug 602 and connecting bar 502.

With reference to FIG. 5A, one type of an opposing securing device 512 is shown as a union connector 606. Union connector 606 is securely connected with connecting bar 502 with first push through connector 504 and second push through connector 506. First push through connector 504 and second push through connector 506 may be of any suitable configuration for connecting, such as, but not limited to, a screw configuration, press-fit configuration, weldable, rivet configuration, and the like.

As depicted, connecting bar 502 is disposed directly on the surface of first endless belt 104 and surface of second endless belt 106 with a gap remaining therebetween, and the belts are aligned on either side of sprocket center ridge tooth 202 of sprocket center ridge 110 on sprocket 102. Union connector 606 is disposed in adjacent belt split tooth spaces of belt split teeth 118 of first endless belt 104 and of second endless belt 106. First retention flange 508 or second retention flange 510 of connecting bar 502 are also shown.

Figure 7:
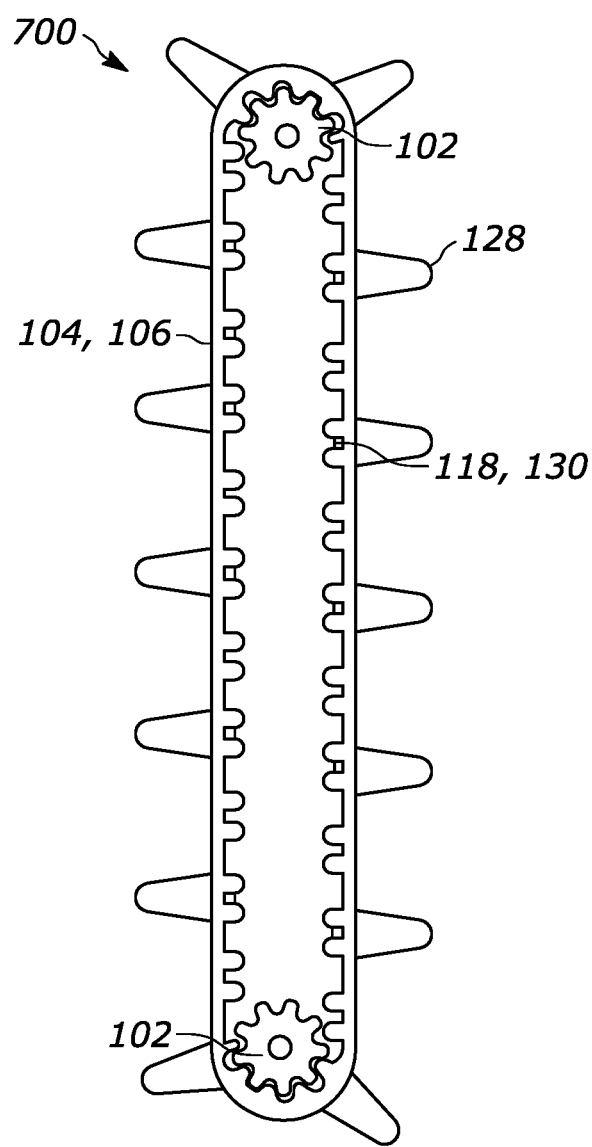
FIG. 7 shows a synchronous belt system, in a side view in accordance with the disclosure.

Now referencing FIG. 7 which shows a synchronous belt system 700, in a side view, which is useful for manipulating material. Synchronous belt system 700 includes endless belts, such as first belt 104 and second belt 106, and two sprockets 102 with which the endless belts are engaged. The system further includes lugs 128 (fourteen shown) attached to the endless belts via belts attachment hardware 130 through the belts' split teeth 118.

Figure 8:
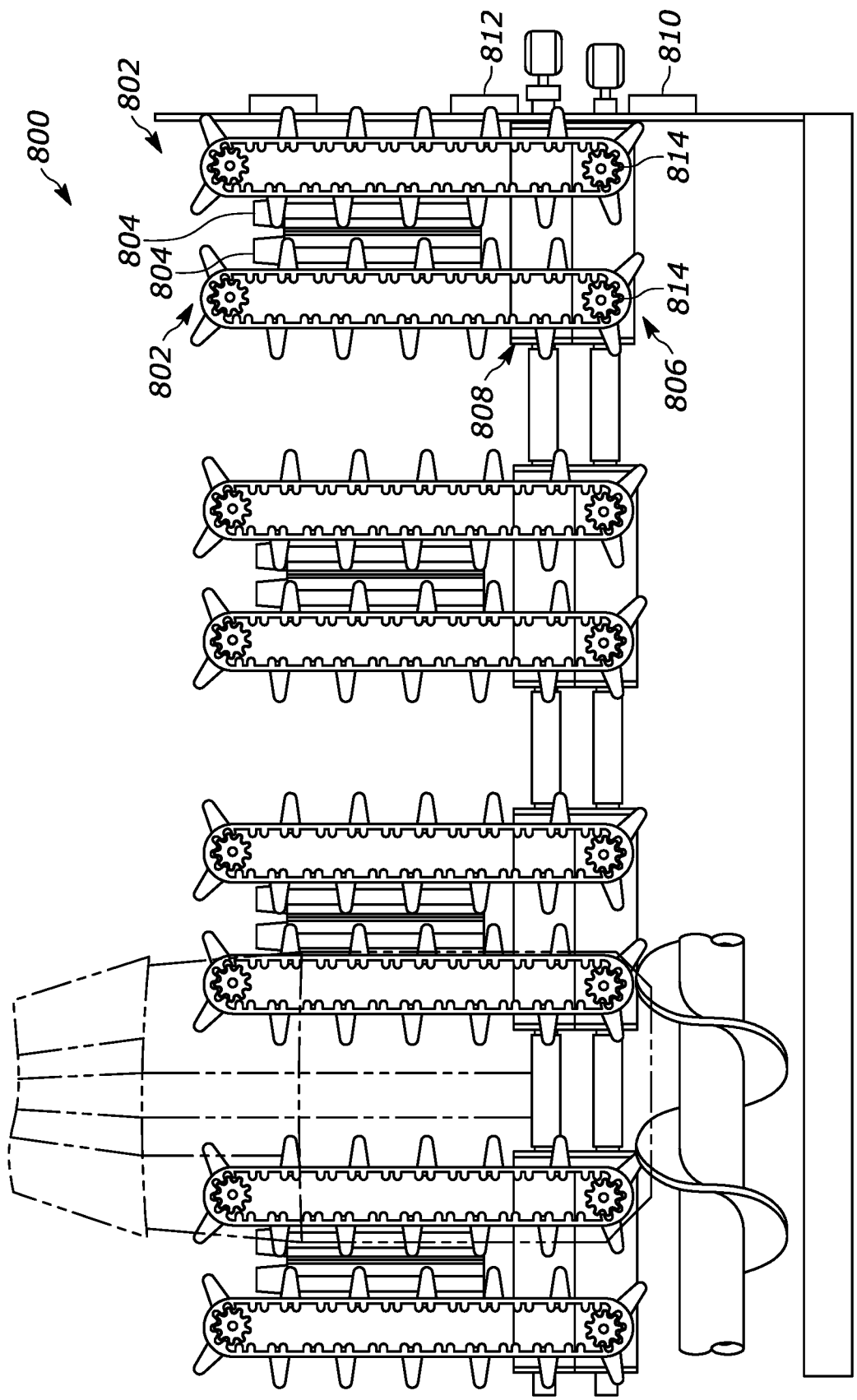
FIG. 8 is a top view of a portion of a crop head used in conjunction with a harvester; and, FIG. 9 is a side perspective view of a crop harvester.

With reference to FIG. 8, a crop head 800, which is used to harvest multiple rows of crops at a time, includes a pair of synchronous gathering belt systems 802, such as those described above, a first pair of knife rolls 804, a synchronous gathering belt drive system 806 mechanically connected to the pair of synchronous gathering belt systems 802, a knife roll drive system 808 mechanically connected to the pair of knife rolls 804, a gathering belt speed switch (further shown in FIG. 9) connected to a belt speed controller 810, and a knife roll speed switch (further shown in FIG. 9) connected to a knife roll speed controller 812. A pair of sprockets 814 are mounted to output shafts to drive the synchronous gathering belt systems 802. The pair of knife rolls 804 are directly connected to the first knife roll output shafts. This arrangement may be used, or repeated, across a crop head as many times deemed suitable. Four are shown in the embodiment of FIG. 8.

Figure 9:
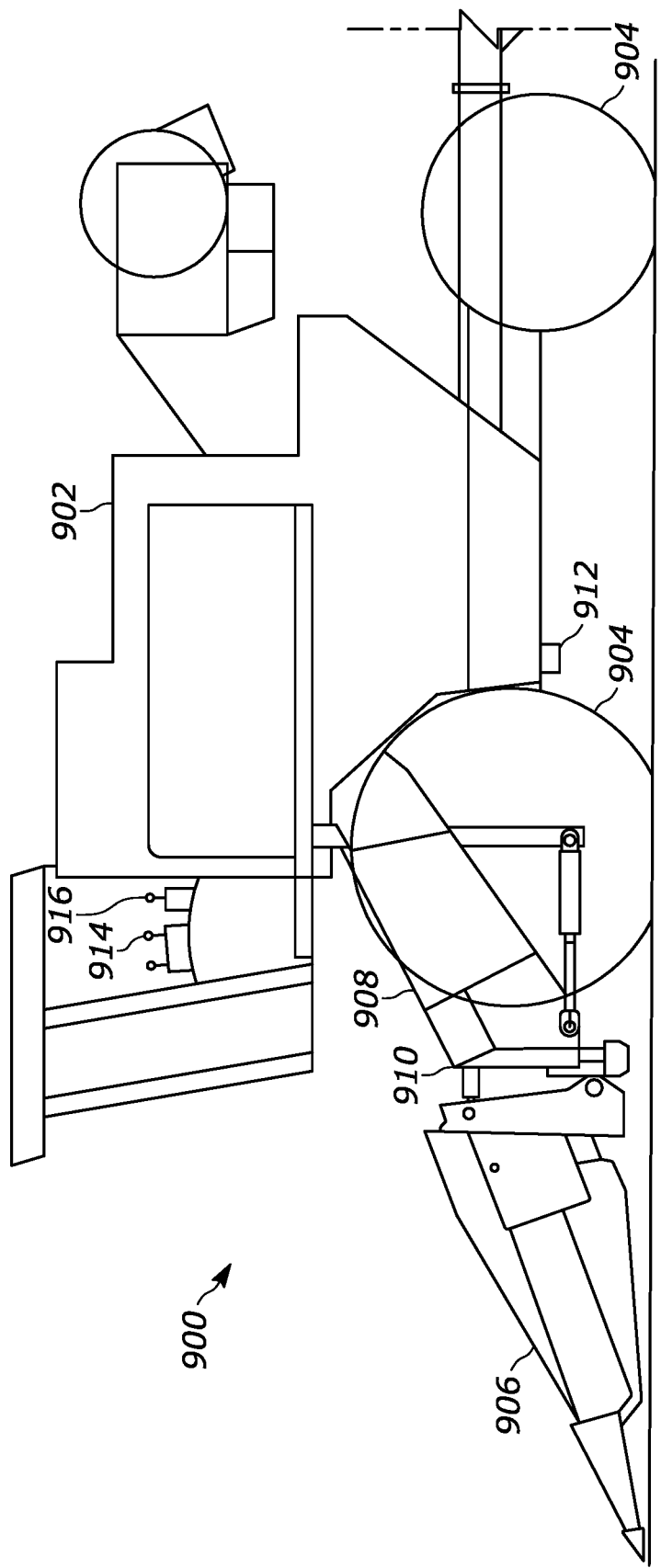

Synchronous belt system embodiments are useful in conjunction with corn, or other crop, harvesters, in addition to any other equipment for conveying or otherwise manipulating materials. FIG. 9 is a schematic view of one type of harvester 900, which includes a chassis 902 supported on wheels or tracks 904, where the chassis 902 supports a crop head 906 (such as crop head 800 depicted in FIG. 8) for harvesting corn through a feeder house 908 with a crop head angle adjuster 910 connected between the crop head 906 and the feeder house 908. The crop head 906 may be like or different from that depicted in FIG. 8.

A ground speed sensor 912 may be mounted to the chassis 902 and detects the ground speed of the harvester 900. Both the ground speed sensor 912 and a gathering belt speed switch 914 are connected either electrically or hydraulically to a gathering belt speed controller. The harvester 900 may also include a knife roll speed switch 916.

In addition to the context of using the synchronous belt systems for manipulating materials such as crops or grains in agricultural applications described in FIG. 8 and FIG. 9 above, it is within the scope of the disclosure to apply the synchronous belt systems for any suitable application, such as, but not limited to, conveying silage, particulates, stone, sawdust, and the like, use in a cutting system, i.e. crop cutting, or even in a grain elevator system.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

| List of reference numerals (part of the specification): | |
|---|---|
| 100 | Synchronous belt system |
| 102 | Sprocket |
| 104 | First endless belt |
| 106 | Second endless belt |
| 108 | Sprocket tooth space |
| 110 | Sprocket center ridge |
| 112 | Sprocket teeth |
| 114 | Sprocket mounting port |
| 116 | Belts gap |
| 118 | Belt split teeth |
| 120 | First belt ridge |
| 122 | Second belt ridge |
| 124 | Belt split tooth space |
| 126 | Belt port |
| 128 | Conveying lug |
| 130 | Belts attachment hardware |
| 202 | Sprocket center ridge tooth |
| 204 | Sprocket center ridge tooth space |
| 302 | Connecting bar |
| 304 | First threaded end |
| 306 | Second threaded end |
| 308 | First nut |
| 310 | Second nut |
| 402 | Threaded U-clamp |
| 500 | Synchronous belt system |
| 502 | Connecting bar |
| 504 | First push through connector |
| 506 | Second push through connector |
| 508 | First retention flange |
| 510 | Second retention flange |
| 512 | Opposing securing device |

-continued

| List of reference numerals (part of the specification): | |
|---|---|
| 600 | Synchronous belt system |
| 602 | Conveying lug |
| 604 | Attachment profile |
| 606 | Union connector |
| 700 | Synchronous belt system |
| 800 | Crop head |
| 802 | Synchronous gathering belt system |
| 804 | Knife rolls |
| 806 | Synchronous gathering belt drive system |
| 808 | Knife roll drive system |
| 810 | Belt speed controller |
| 812 | Knife roll speed controller |
| 814 | Sprocket |
| 900 | Harvester |
| 902 | Chassis |
| 904 | Wheels |
| 906 | Crop head |
| 908 | Feeder house |
| 910 | Crop head angle adjuster |
| 912 | Ground speed sensor |
| 914 | Gathering belt speed switch |
| 916 | Knife roll speed switch |

What is claimed is:

1. A synchronous belt system comprising a plurality of sprockets, a first endless belt, and a second endless belt;
wherein the first endless belt and the second endless belt are connected together with belts attachment hardware through belt ports and wherein a belts gap is defined between the first endless belt and the second endless belt;
wherein each of the plurality of sprockets comprises sprocket teeth and sprocket tooth spaces between adjacent teeth of the sprocket teeth, and wherein each of the plurality of sprockets comprise a sprocket center ridge;
wherein the first endless belt and the second endless belt comprise a plurality of belt split teeth, and wherein each split tooth of the plurality of belt split teeth comprises a first belt ridge, a second belt ridge and a belt split tooth space disposed between the first belt ridge and the second belt ridge; and,
wherein the belts gap engages the sprocket center ridge of each of the sprockets, and wherein each of the belts attachment hardware is disposed within the adjacent belt split tooth spaces of the first endless belt and the second endless belt.

2. The synchronous belt system according to claim 1, wherein each of the sprockets comprises a sprocket mounting port.

3. The synchronous belt system according to claim 1, wherein the plurality of sprockets consists of two sprockets.

4. The synchronous belt system according to claim 1, wherein the belts attachment hardware comprises a connecting bar in contact with the first endless belt and the second endless belt.

5. The synchronous belt system according to claim 1, wherein the belts attachment hardware comprises a first threaded end, a first nut, a second threaded end and a second nut.

6. The synchronous belt system according to claim 5, wherein the first threaded end (304) and the second threaded end are opposing ends of a U-clamp.

7. The synchronous belt system according to claim 1, wherein each of the belt ports is disposed in each of the belt split teeth.

8. The synchronous belt system according to claim 1 further comprising a plurality of conveying lugs.

9. The synchronous belt system according to claim 8, wherein each lug of the plurality of conveying lugs are connected together with the belts attachment hardware through the belt ports.

10. The synchronous belt system according to claim 8, wherein the conveying lugs are disposed opposite the belt split teeth of the first endless belt and opposite the belt split teeth of the second endless belt.

11. The synchronous belt system according to claim 8, wherein the plurality of sprockets are connect to material manipulating equipment.

12. The synchronous belt system according to claim 11, wherein the plurality of sprockets consists of two sprockets, and wherein one of the two sprockets is mounted to a drive shaft and the other of the two sprockets is mounted to an idler shaft.

13. The synchronous belt system according to claim 12, wherein at least one of the plurality of conveying lugs is in contact with a conveyed material.

14. The synchronous belt system according to claim 13, wherein the material manipulating equipment is crop conveying equipment.

15. The synchronous belt system according to claim 14, wherein the crop conveying equipment is a crop gathering head of a harvester.

16. The synchronous belt system according to claim 11, wherein the material manipulating equipment conveys silage, particulates, stone or sawdust.

17. The synchronous belt system according to claim 1, wherein the plurality of sprockets are connect to material cutting equipment.

18. The synchronous belt system according to claim 17 further comprising a plurality of material cutting features which are connected to the first endless belt and the second endless belt with the belts attachment hardware through the belt ports; and,
wherein each of the plurality of material cutting features are disposed opposite the belt split teeth of the first endless belt and opposite the belt split teeth of the second endless belt.

19. The synchronous belt system according to claim 18, wherein the material cutting features are crop cutting features.

20. The synchronous belt system according to claim 1, wherein belts of the synchronous belt system consist of the first endless belt and the second endless belt.

* * * * *